(12) United States Patent
Duffy et al.

(10) Patent No.: US 12,037,210 B2
(45) Date of Patent: Jul. 16, 2024

(54) DOCK BUMPER HAVING PROGRESSIVE SPRING RATE

(71) Applicant: DL Manufacturing, Inc., North Syracuse, NY (US)

(72) Inventors: Gregory J. Duffy, Baldwinsville, NY (US); Kyle J. Berean, Canastota, NY (US); Kristian P. Garrow, Cortland, NY (US); Donald L. Metz, Kirkville, NY (US)

(73) Assignee: DL MANUFACTURING, INC., North Syracuse, NY (US)

( * ) Notice: Subject to any disclaimer, the term of this patent is extended or adjusted under 35 U.S.C. 154(b) by 1469 days.

(21) Appl. No.: 16/056,473

(22) Filed: Aug. 6, 2018

(65) Prior Publication Data

US 2019/0039841 A1 Feb. 7, 2019

Related U.S. Application Data (60) Provisional application No. 62/541,399, filed on Aug. 4, 2017.

(51) Int. Cl.
| | |
|---|---|
| *B65G 69/00* | (2006.01) |
| *F16F 1/377* | (2006.01) |
| *F16F 1/44* | (2006.01) |
| *G10K 11/162* | (2006.01) |

(52) U.S. Cl.
CPC ......... *B65G 69/008* (2013.01); *B65G 69/001* (2013.01); *F16F 1/377* (2013.01); *F16F 1/44* (2013.01); *G10K 11/162* (2013.01); *F16F 2224/0208* (2013.01); *F16F 2224/025* (2013.01); *F16F 2228/066* (2013.01); *F16F 2228/14* (2013.01); *F16F 2236/04* (2013.01)

(58) Field of Classification Search
CPC .. F16F 1/377; F16F 2228/14; F16F 2228/066; F16F 2224/0208; F16F 2224/025; F16F 2236/04; F16F 1/44; B65G 69/001; B65G 69/008; G10K 11/162
See application file for complete search history.

(56) References Cited

U.S. PATENT DOCUMENTS

| | | | | |
|---|---|---|---|---|
| 2,727,738 A | * | 12/1955 | Lindley | .................... F16F 1/377 |
| | | | | 217/53 |
| 3,402,924 A | * | 9/1968 | Rix | .......................... F16F 1/422 |
| | | | | 267/141 |
| 4,854,258 A | * | 8/1989 | Hausmann | ................ E02B 3/26 |
| | | | | 114/220 |

(Continued)

FOREIGN PATENT DOCUMENTS

| | | | | |
|---|---|---|---|---|
| WO | WO-9633117 A1 | * | 10/1996 | ............. B60R 19/56 |
| WO | WO-0027734 A1 | * | 5/2000 | ........... B65G 69/008 |

*Primary Examiner* — Bradley T King
(74) *Attorney, Agent, or Firm* — Barry F. Manna (57) ABSTRACT

A dock bumper for a loading dock includes a rear mounting plate for use in securing the dock bumper to a loading dock wall, a front contact surface configured to engage a vehicle backing into the loading dock, and an elastomer spring block positioned between the rear mounting plate and the front contact surface. The elastomer spring block includes an elastomeric material defining a pattern of geometric cavities. The geometric cavities are configured to provide a progressive spring rate in a longitudinal direction relative to the loading dock.

17 Claims, 10 Drawing Sheets

(56) References Cited

U.S. PATENT DOCUMENTS

| | | | | |
|---|---|---|---|---|
| 4,936,539 A | * | 6/1990 | Nangle | F16F 1/377 267/140 |
| 5,201,489 A | * | 4/1993 | Wolf | B29C 33/485 267/141 |
| 5,284,315 A | * | 2/1994 | Hofmann | F16F 13/10 267/141 |
| 6,120,871 A | * | 9/2000 | De Biase | B65G 69/001 428/323 |
| 2002/0148177 A1 | * | 10/2002 | DiBiase | B65G 69/008 52/180 |
| 2007/0161267 A1 | * | 7/2007 | Ott | B65G 69/001 439/74 |
| 2010/0146876 A1 | * | 6/2010 | Eungard | B65G 69/008 52/309.7 |
| 2012/0032379 A1 | * | 2/2012 | Kolb | B62D 33/0604 267/141 |
| 2017/0217697 A1 | * | 8/2017 | Kish | B65G 69/2811 |
| 2019/0144217 A1 | * | 5/2019 | Di Biase | F16F 1/377 267/140 |
| 2020/0262662 A1 | * | 8/2020 | Huber | F16F 1/44 |

\* cited by examiner

DOCK BUMPER HAVING PROGRESSIVE SPRING RATE

CROSS REFERENCE TO RELATED APPLICATION

Reference is made to and this application claims priority from and the benefit of U.S. Provisional Application Ser. No. 62/541,399, filed Aug. 4, 2017, entitled "DOCK BUMPER HAVING PROGRESSIVE SPRING RATE", which application is incorporated herein in its entirety by reference.

FIELD OF THE INVENTION

This disclosure relates generally to loading docks and, more specifically, to a dock bumper having a progressive spring rate.

BACKGROUND OF THE INVENTION

Conventional loading docks include an overhead door frame, a dock platform or floor, a recess or pit in the floor, and a dock leveler assembly within the pit to compensate for height differences between a dock platform and the bed of a parked vehicle such as a tractor trailer truck. A dock bumper is typically positioned against the outside dock wall to either side of the pit, extending longitudinally away from the dock floor approximately 4 to 6 inches. The bumpers are engaged by the rear frame or bumper of the vehicle when the vehicle is backed into a parked position relative to the dock leveler assembly. The bumpers prevent the vehicle from striking and damaging the dock wall and the various components of the dock leveler assembly.

Conventional dock bumpers are fabricated from strips of molded rubber, used rubber tires, or wood. In one typical construction, rubber strips can be formed into a stack ten inches wide, eighteen inches high, and six inches deep. The stack can be sandwiched between steel plates and the plates can be bolted so as to compress the strips, thereby forming a bumper assembly. The steel plates, which can include an L-bracket, compress the bumper assembly and can be secured to the dock wall using the bracket. The steel plates that compress the bumper assembly can be secured to the dock wall by several bolts, or welded directly to a steel plate embedded into the loading dock exterior wall.

Although a bumper assembly formed from molded rubber, rubber strips, or wood can be useful and may be advantageous for certain applications, it suffers from drawbacks. One drawback is that shock loads from the vehicle hitting the bumpers are transferred directly into the dock wall. The stack of rubber strips is designed to contact the dock wall, when compressed. However, the rubber strips do not completely contact the dock wall and may contact in an uneven manner. In addition, due to the spring rate characteristics of the rubber material, the rubber undergoes only a limited amount of compression, after which higher loads transfer directly to the dock wall or to the trailer. In the case when a trailer hits the bumper hard, the rubber strips absorb a relatively small portion of the load and the remainder is transferred as a shock load to the dock wall or trailer. Over time, the repeated shock loads can damage the trailer or cause the dock wall to deteriorate, since the wall was not specifically designed to absorb the concentrated point loads.

SUMMARY OF THE INVENTION

In accordance with one aspect of the disclosure, a dock bumper for a loading dock includes a rear mounting plate for use in securing the dock bumper to a loading dock wall, a front contact surface configured to engage a vehicle backing into the loading dock, and an elastomer spring block positioned between the rear mounting plate and the front contact surface. The elastomer spring block includes an elastomeric material defining a pattern of geometric cavities. The cavities are configured to provide a progressive spring rate in a longitudinal direction relative to the loading dock.

In one embodiment, the spring rate progressively increases as the elastomer spring block compresses.

In one embodiment, the pattern of geometric cavities include successively decreasing cross-sectional areas in the direction of the spring rate.

In another embodiment, the pattern of geometric cavities are equal in cross-sectional area.

In another embodiment, the front contact surface includes a hardened plate to protect the elastomer spring block from damage.

In accordance with another aspect of the disclosure, a bumper includes an elastomer spring block. The spring block includes an elastomeric material defining a pattern of geometric cavities. The cavities are configured to provide a progressive spring rate in a direction of compression.

In one embodiment, the geometric cavities extend through the entire length of the elastomeric material, transverse to the direction of compression. The geometric cavities are configured to progressively increase the spring rate as the elastomeric material compresses.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Embodiments of the present invention solve the noted deficiencies with conventional dock bumpers by providing a dock bumper with a progressive spring rate. A pattern of geometric cavities in the bumper can provide an increasing spring rate as a trailer compresses the bumper. The energy of the trailer impacting the bumper may be gradually absorbed until full compression of the bumper is achieved. The fully compressed bumper provides a convenient 'hard stop' for the trailer, at which point the trailer tires may be chocked. The gradual compression prevents shock loads from being imparted to the trailer or loading dock wall.

Other embodiments of the present invention provide an acoustic-dampening bumper or cushion having a progressive spring rate. The bumper may be particularly useful in applications that demand both sound-absorption and the cushioning of high-impact loads.

For purposes of illustration and to further explain orientation of certain features of the invention, a lateral axis is defined as substantially parallel to the loading dock wall and is denoted as the x-axis; a longitudinal axis is defined as substantially in the direction of vehicle motion when backing into the loading dock and is denoted as the y-axis; and the vertical axis is denoted as the z-axis.

Figure 1:
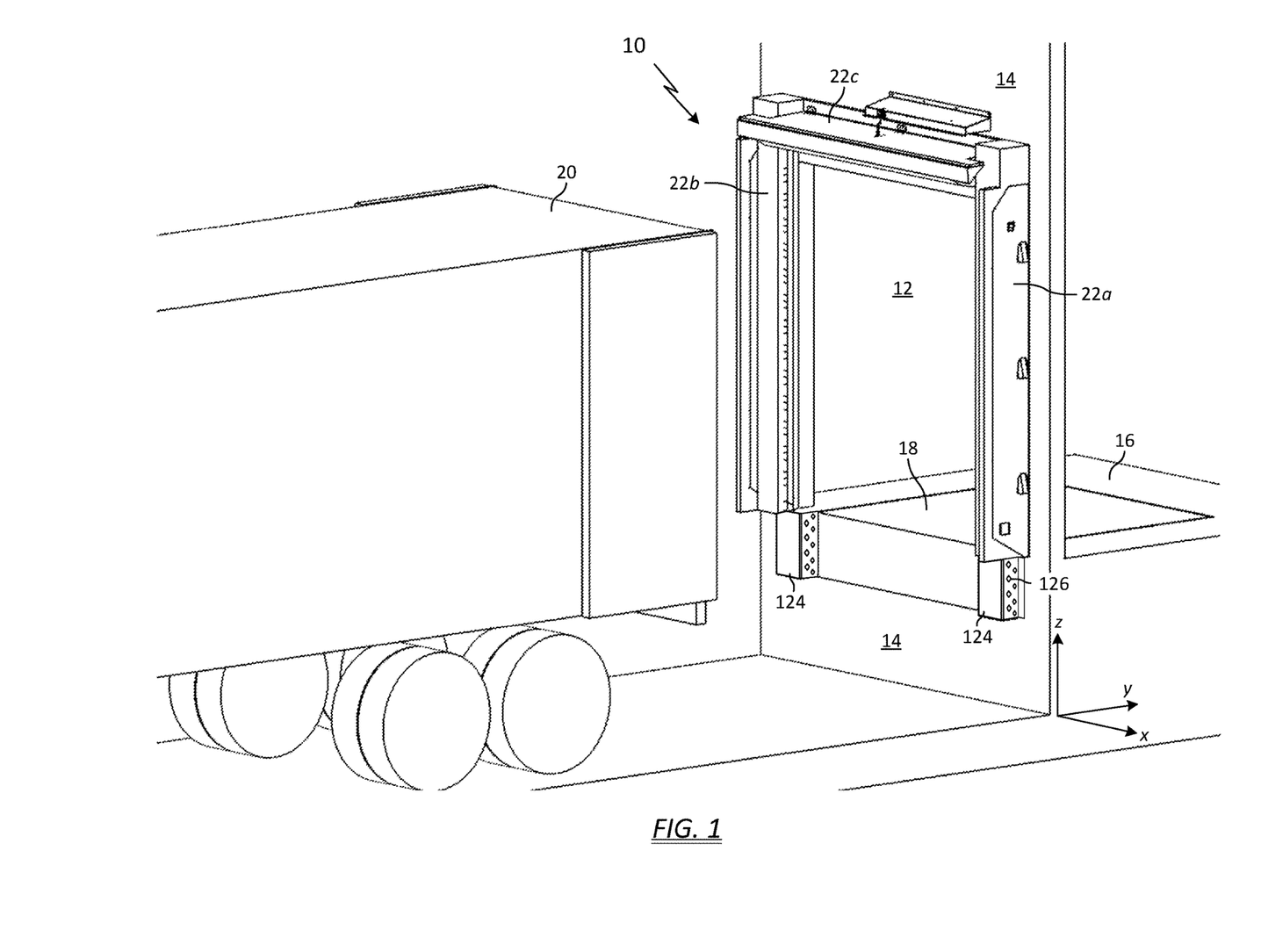
FIG. 1 depicts a top perspective view of a loading dock, trailer, and dock bumper according to one embodiment of the present invention.

Referring to FIG. 1, a perspective view of a loading dock 10 is illustrated. The loading dock 10 generally includes an opening 12 in the wall structure 14, which in the illustrated example is an exterior wall to the building. The loading dock 10 further includes a loading surface or floor 16 extending into the building, and may further include a dock leveler assembly 18 to compensate for the longitudinal gap and difference in vertical height between the floor 16 and the bed of a parked trailer 20. The loading dock 10 may further include a dock seal structure 22 surrounding the door opening 12, adapted to provide an environmental seal between the interior of the trailer 20 and the loading dock. The dock seal structure may include vertical side members 22a, 22b along either side of the door opening, and a horizontal header 22c extending across the top of the door.

The loading dock 10 further includes a dock bumper 124 positioned against the dock wall 14 to either side of the dock leveler assembly 18, protruding longitudinally outwards approximately 6-10 inches. The dock bumper 124 includes a pattern of geometric cavities 126 that provide a progressive spring rate when the bumper is compressed. The dock bumper 124 is engaged by the rear frame or bumper of the vehicle 20 when it is backed into a parked position relative to the dock, and when the geometric cavities 126 are fully collapsed the bumper provides a positive stop for the vehicle (e.g., the vehicle can move no closer to the dock). The dock bumpers 124 prevent the vehicle from striking and damaging the trailer 20, dock wall 14, and the various components of the dock leveler assembly 18.

At a first step in an exemplary docking operation, a vehicle 20 backing into the loading dock 10 first engages the dock seal structure 22. The dock seals deform to provide an effective seal around the sides and top of the trailer. At a second step, the trailer continues to back up towards the dock, and then engages the dock bumpers 124. At a third step, the dock bumpers 124 gradually compress as the geometric cavities 126 collapse, and the bumper spring rate progressively increases, which progressively increases the resistance to the trailer's backward motion. At a final step, the geometric cavities 126 are fully compressed, and the bumper spring rate is great enough to prevent the trailer from further backwards movement. The trailer tires can then be chocked.

Figure 2:
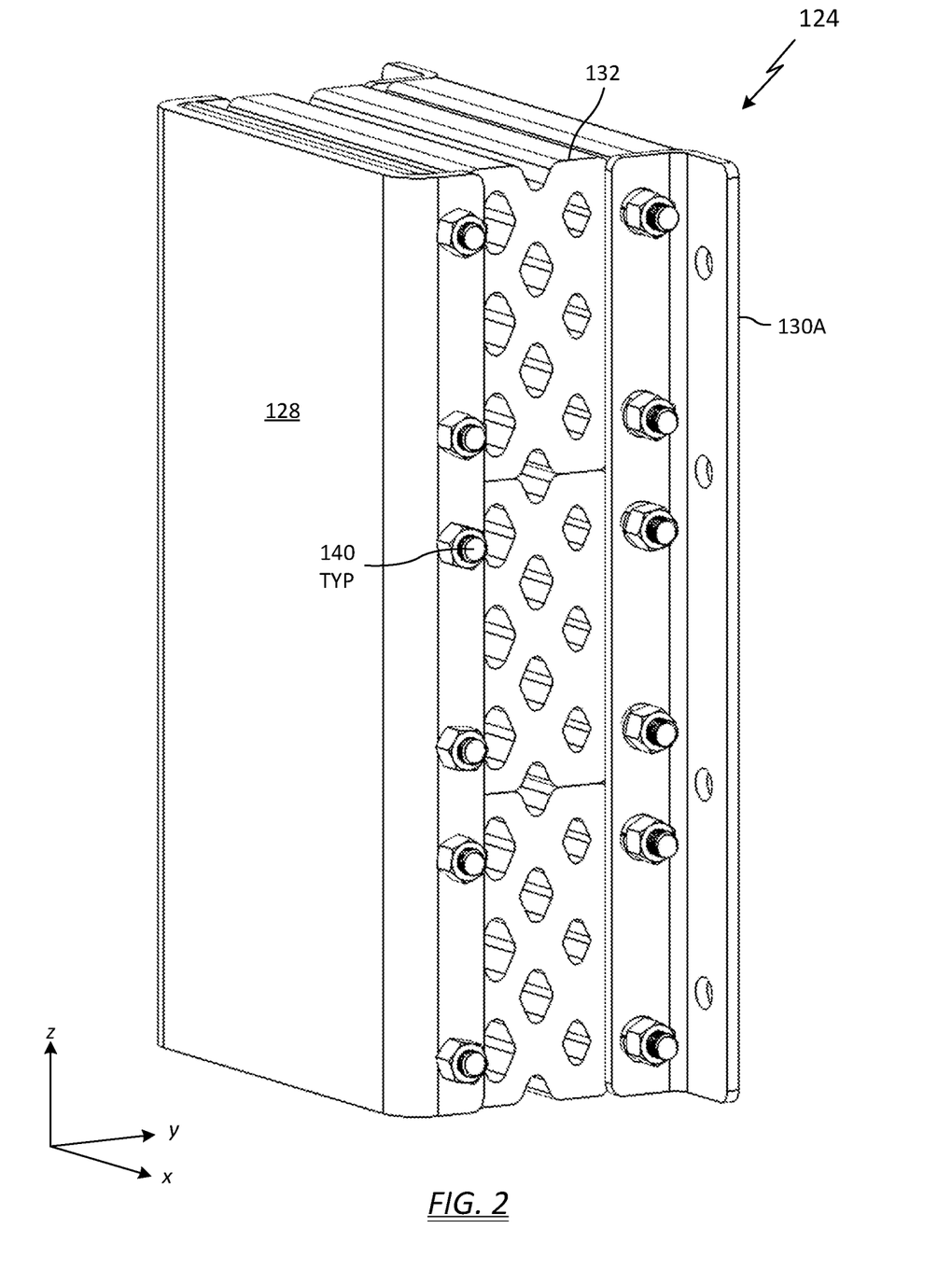
FIG. 2 depicts a perspective view of the dock bumper shown of FIG. 1.
Figure 3:
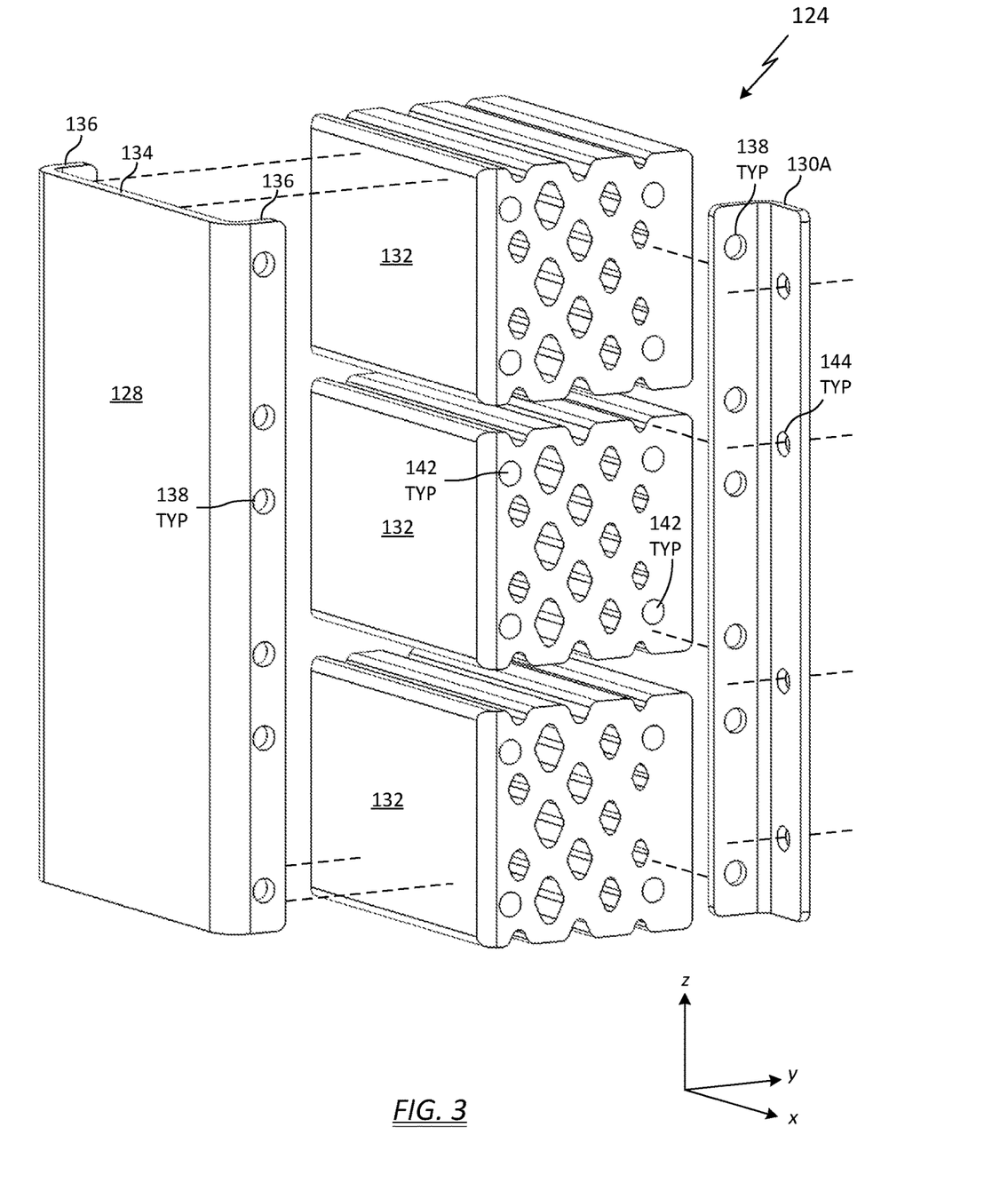
FIG. 3 depicts an exploded view of the dock bumper shown in FIG. 2.

Referring now to FIGS. 2 and 3, the dock bumper 124 is shown in greater detail. FIG. 2 depicts the bumper in an assembled state, and FIG. 3 depicts an exploded view of the bumper assembly. The dock bumper 124 may include a front contact surface 128 for the trailer 20 to engage the bumper, a rear mounting plate 130 configured to be secured to the loading dock wall 14, and an elastomer spring block 132 positioned between the front contact surface 128 and the rear mounting plate 130.

In one embodiment of the invention, the dock bumper 124 provides superior wear resistance to repeated hits from the trailer 20. The front contact surface 128 comprises a hardened plate 134 to protect the elastomer spring block 132 from damage. In one example, the front contact surface 128 can include side extensions 136 that are welded, formed, or otherwise integral with the hardened plate 134. The side extensions 136 can define opposing thru holes 138 to accommodate a fastener 140, such as a carriage bolt and nut. The fasteners 140 can pass through corresponding holes 142 in the elastomer spring block 132, so that the front contact surface 128 and spring block 132 can be tightly secured together. The front contact plate 128 may be formed from any material that can withstand the environment and impact loads, such as steel or a hard polymer, for example.

The rear mounting plate 130 secures the dock bumper 124 to the loading dock wall 14. The rear mounting plate 130 can define opposing thru holes 138 to accommodate a fastener 140, such as a carriage bolt and nut. The fasteners 140 can pass through corresponding holes 142 in the elastomer spring block 132, so that the rear mounting plate 130 and spring block 132 can be tightly secured together. The rear mounting plate 130 may be formed from steel, for example.

Figure 4:
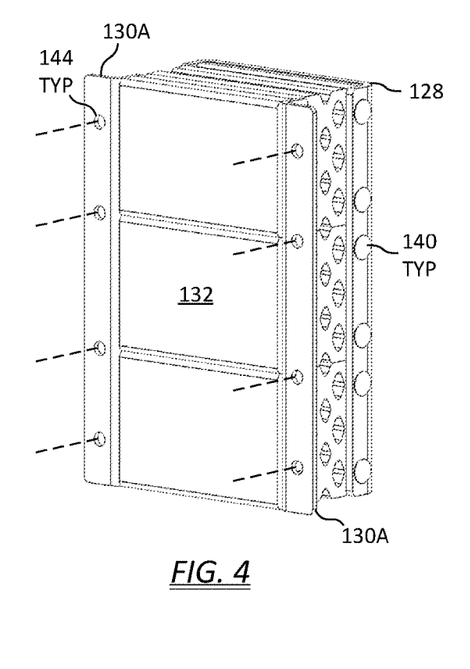
FIG. 4 depicts a rear perspective view of the dock bumper shown in FIG. 2.
Figure 5:
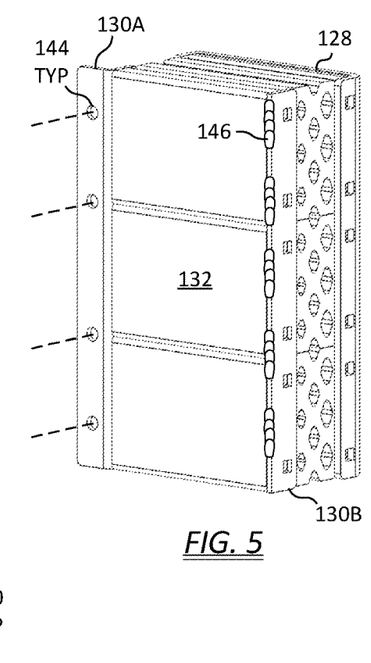
FIG. 5 depicts a rear perspective view of a dock bumper according to another embodiment of the present invention.
Figure 6:
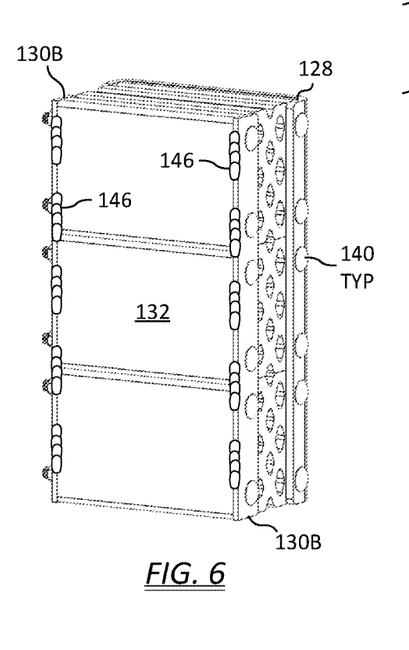
FIG. 6 depicts a rear perspective view of a dock bumper according to yet another embodiment of the present invention.

Depending upon the configuration of the dock wall, the rear mounting plate 130 may have one of three different arrangements, shown in FIGS. 4-6. FIGS. 2-4 depict a double angle arrangement, in which the dock bumper 124 can be mounted directly to a concrete wall. The rear mounting plate includes two right-angle brackets 130A having holes 144 to accommodate concrete anchors (see dashed lines). FIG. 5 depicts a single-angle arrangement, in which one side of the dock bumper 124 can be mounted directly to a concrete wall, and the other side can be welded to an embedded steel angle surrounding the pit of the dock leveler assembly 18. In one example, the rear mounting plate 130B, which is flat, can be stitch welded 146 to the metal (not shown). The right-angle bracket 130A on the opposing side of the bumper 124 can be secured to the concrete with concrete anchors. FIG. 6 depicts a flat mount arrangement in which both sides of the dock bumper 124 can be welded to a metal plate (not shown) that is embedded in the loading dock wall 14. In one example, both rear mounting plates 130B, which are flat, can be stitch welded 146 to the metal (not shown).

Figure 7:
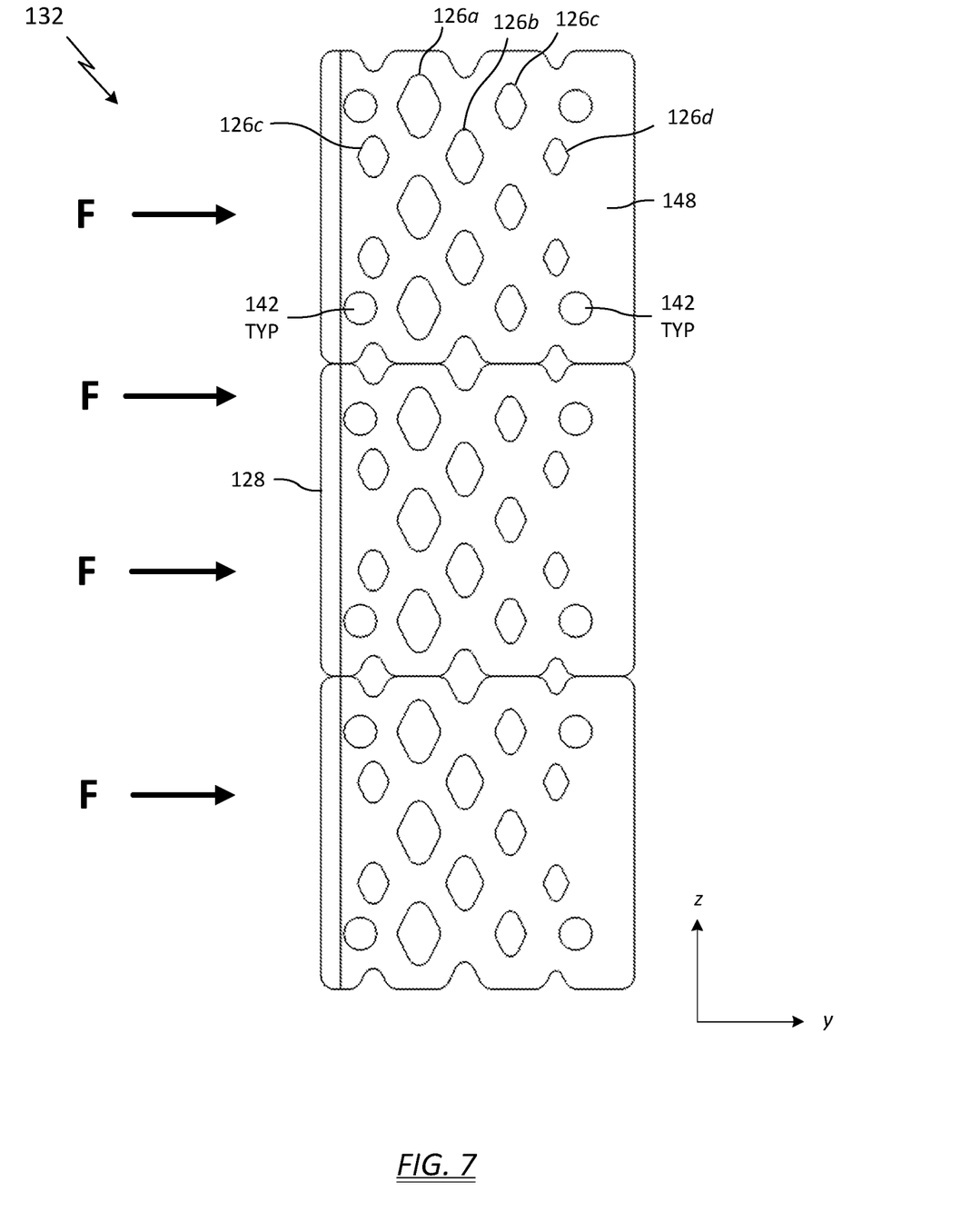
FIG. 7 depicts a side plan view of the elastomer spring block shown in FIG. 2.

Turning now to FIG. 7, the elastomer spring block 132 can include an elastomeric material 148 defining a pattern of geometric cavities 126 configured to provide a progressive spring rate in a longitudinal direction relative to the loading dock 10. In the illustrated example, the elastomer spring block 132 comprises three sections of elastomeric material 148, stacked vertically in the z-direction to provide a bumper with adequate height. Each section of elastomeric material may be approximately 9 inches wide, 6 inches high, and 6 inches deep, giving a total bumper height of approximately 18 inches. In practice, any number of sections of elastomeric material (including a single piece) can be used to achieve the desired width, height, and depth. For example, the width of the elastomer spring block could span the width of the dock door opening 12, or approximately ten feet. One advantage to the disclosed configuration having vertically stacked blocks is that the overall height of the dock bumper 124 can easily be tailored to 6-inch increments. For example, the illustrated embodiment depicts an overall height of 18 inches but, by adding or subtracting spring block segments, the overall height could be tailored to 12 or 24 inches.

In one example, the elastomeric material 148 is ethylene propylene diene monomer rubber (EPDM). In another example, the elastomeric material 148 is neoprene rubber. Both rubbers exhibit excellent resistance to abrasion and weathering, but EPDM is superior to neoprene in ultraviolet (UV) and ozone resistance. The elastomeric material 148 can be molded or extruded to form the elastomer spring block 132. If extruded, the pattern of geometric cavities 126 can be formed during the extrusion process. If the elastomeric material 148 is molded, the pattern of geometric cavities 126 can be formed by laser cutting, for example.

In the illustrated example, the size and volume of the geometric cavities 126 in the elastomeric material 148 progressively decrease in the longitudinal direction. As such, the effective spring rate progressively increases. As can be seen by the force arrows (F) representing the shock load from a truck trailer, the elastomeric material 148 will initially deform and compress the greatest amount at the largest geometric cavities 126a, which represents the softest spring rate. Eventually the large cavities 126a will collapse, and the next-largest cavities 126b will begin deforming until they, too, collapse. However, because the cavities 126b have a smaller cross-sectional area than cavities 126a, there is more elastomeric material present and thus the spring rate will be higher, providing more resistance. As the trailer continues its backward motion, eventually the geometric cavities 126a-126d will collapse and the elastomeric material will not be able to compress further. At this point, the spring rate of the elastomer spring block 132 becomes greater than the force of the tractor trailer 20, and motion is stopped.

In the illustrated example, each of the three blocks of elastomeric material 148 is approximately 6 inches high (z-direction) and 6 inches deep (y-direction). Cavity 126a is approximately 1.75 inches high and 0.88 inches wide, with a 0.22-inch radius joining the surfaces. Cavity 126b is approximately 1.50 inches high and 0.75 inches wide, with a 0.19-inch radius joining the surfaces. Cavity 126c is approximately 1.25 inches high and 0.63 inches wide, with a 0.16-inch radius joining the surfaces. Cavity 126d is approximately 1.00 inches high and 0.50 inches wide, with a 0.13-inch radius joining the surfaces.

Figure 8:
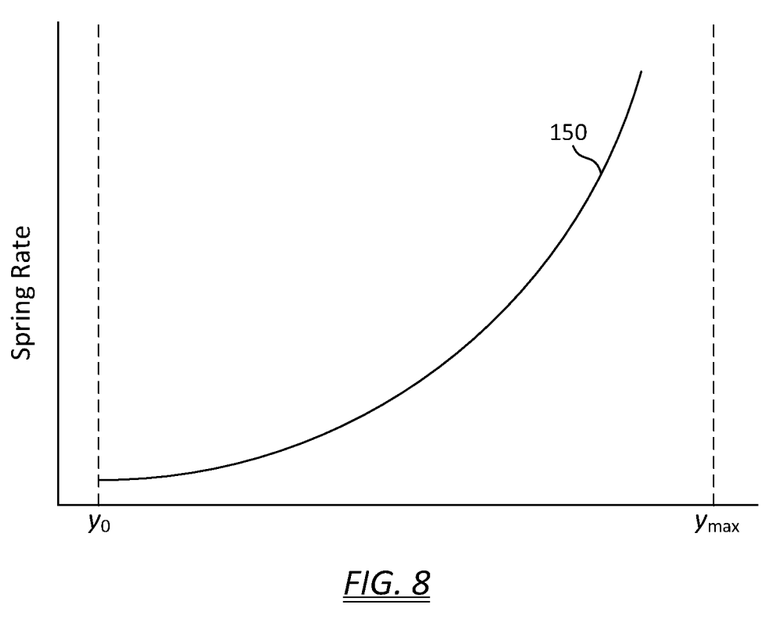
FIG. 8 depicts a graphical illustration of a progressive spring rate according to one embodiment of the present invention.

FIG. 8 depicts a representative graph of a progressively increasing spring rate 150, in which $y_0$ is the initial point of contact (zero compression), and $y_{max}$ is the hard stop where no further compression can occur.

Figure 9:
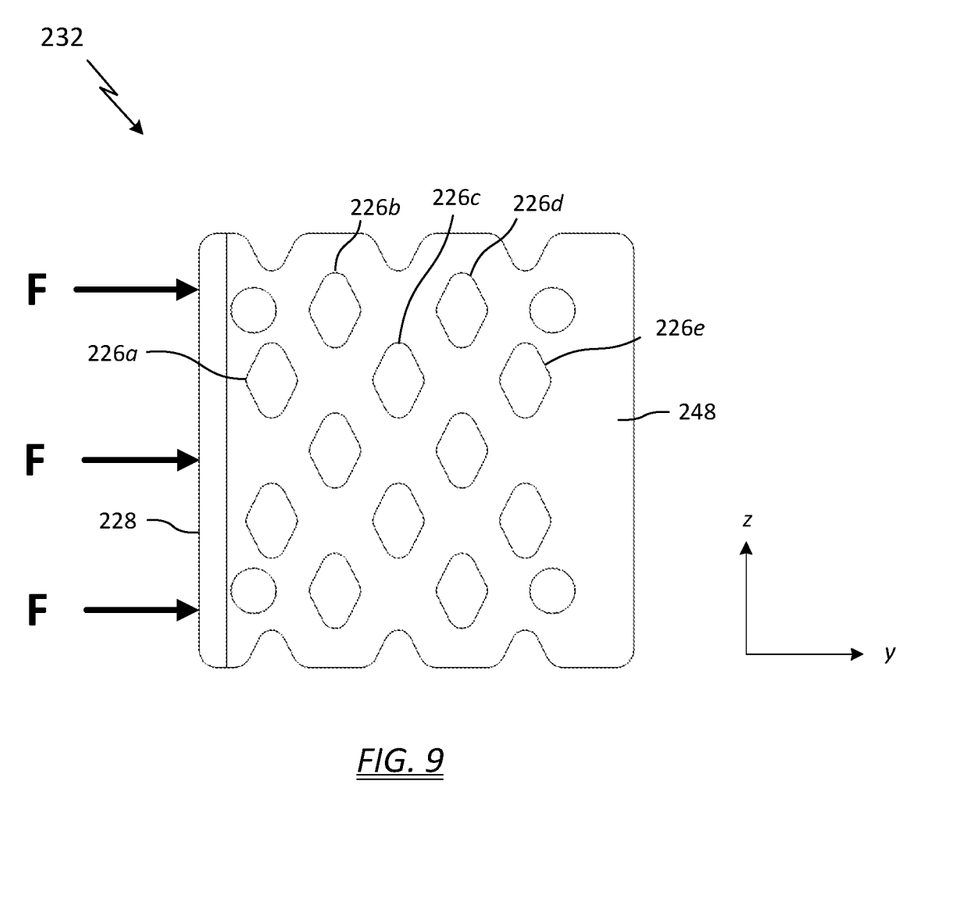
FIG. 9 depicts a side plan view of an elastomer spring block according to another embodiment of the present invention.

The geometry and pattern spacing of the geometric cavities can be configured to a particular application. In the illustrated example, the geometric cavities are diamond-shaped. However, many other geometries can be envisioned within the scope of the invention, such as oval, circular, or triangular. In some embodiments, it may not be necessary to vary the cross-sectional area of the cavities. In other words, they may be the same size throughout, but the pattern spacing achieves the desired progressive spring rate. FIG. 9 depicts one such embodiment. An elastomer spring block 232 can include an elastomeric material 248 defining a pattern of geometric cavities 226a-226e configured to provide a progressive spring rate in a longitudinal direction relative to the loading dock 10. However, in this embodiment, the geometric cavities 226a-226e are equivalent in size. It is contemplated the elastomer spring block 232 still provides a progressive spring rate because the percentage volume of voids (e.g., cavities) in the elastomeric material 248 gradually decreases as the elastomer spring block 232 is compressed.

Figure 10:
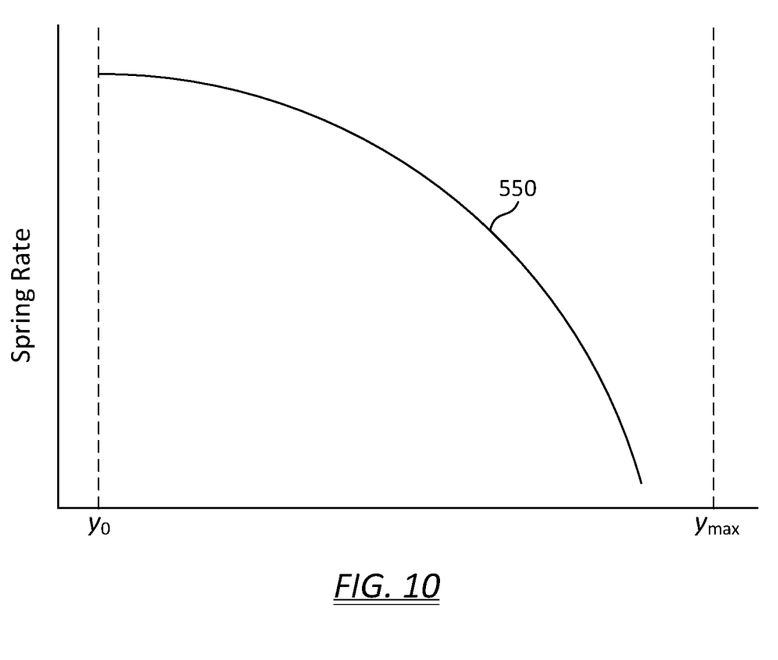
FIG. 10 depicts a graphical illustration of a progressive spring rate according to another embodiment of the present invention.

Furthermore, it is contemplated the size and volume of the geometric cavities could progressively increase in the longitudinal direction, resulting in an effective spring rate that progressively decreases. In this manner, the greatest resistance encountered by the tractor trailer 20 would be during the initial compression, followed by a gradual decrease in resistance. FIG. 10 depicts an exemplary plot of a progressively decreasing spring rate 550, according to another embodiment of the invention.

Figure 11:
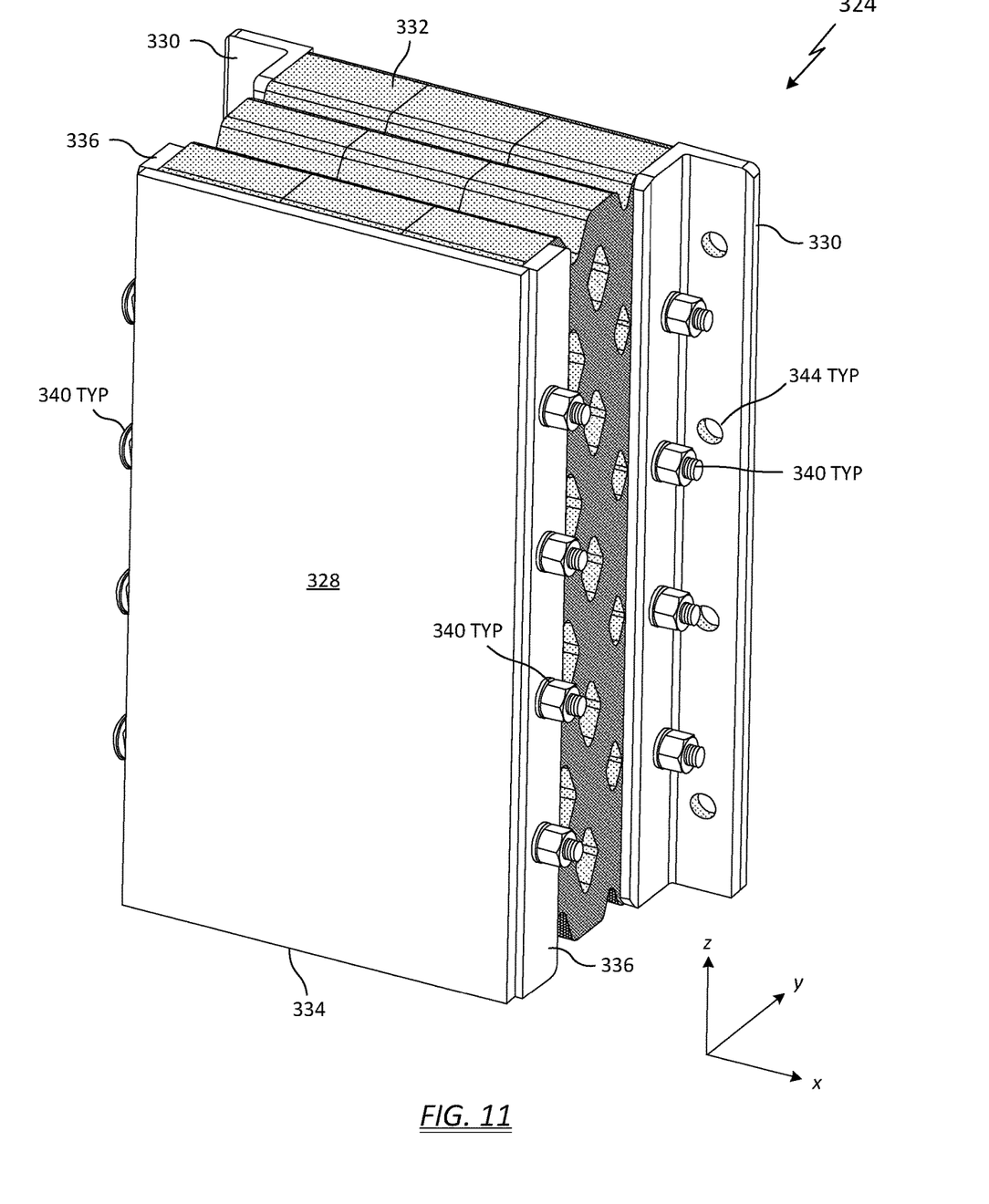
FIG. 11 depicts a perspective view of a dock bumper according to another embodiment of the present invention.

Turning now to FIG. 11, wherein like numerals are used to indicate like parts throughout the various views from FIGS. 2-7, shown is a dock bumper 324 according to another embodiment of the present invention. Similar to the dock bumper shown with respect to FIGS. 2 and 3, the illustrated dock bumper 324 includes a front contact surface 328, rear mounting plates 330, and an elastomer spring block 332 sandwiched or otherwise secured between them.

The front contact surface 328 can include a hardened plate 334 to protect the elastomer spring block 332 from damage. In one example, the front contact surface 328 can include side extensions 336 that are welded, formed, or otherwise integral with the hardened plate 334.

The rear mounting plate 330 secures the dock bumper 324 to the loading dock wall 14. In one arrangement, in which the dock bumper 324 can be mounted directly to a concrete wall, the rear mounting plate 330 includes two right-angle brackets having holes 344 to accommodate concrete anchors.

The rear mounting plate 330 can define opposing thru holes 338 to accommodate a fastener 340, such as a carriage bolt and nut. The fasteners 340 can pass through corresponding holes 338 in the elastomer spring block 332, so that the rear mounting plate 330 and spring block 332 can be tightly secured together. The rear mounting plate 330 may be formed from steel, for example.

Figure 12:
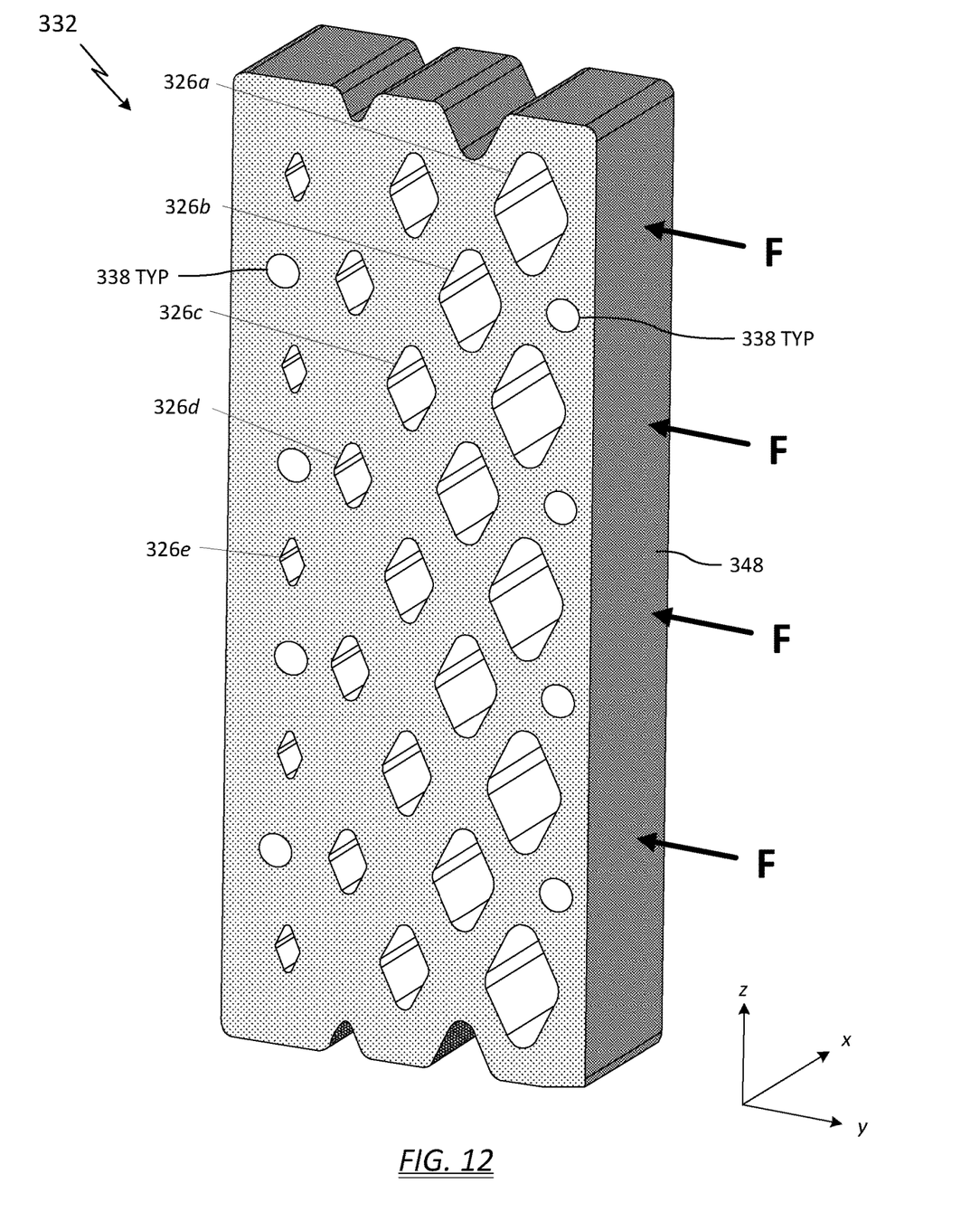
FIG. 12 depicts a side perspective view of the elastomer spring block shown in FIG. 11.
Figure 13:
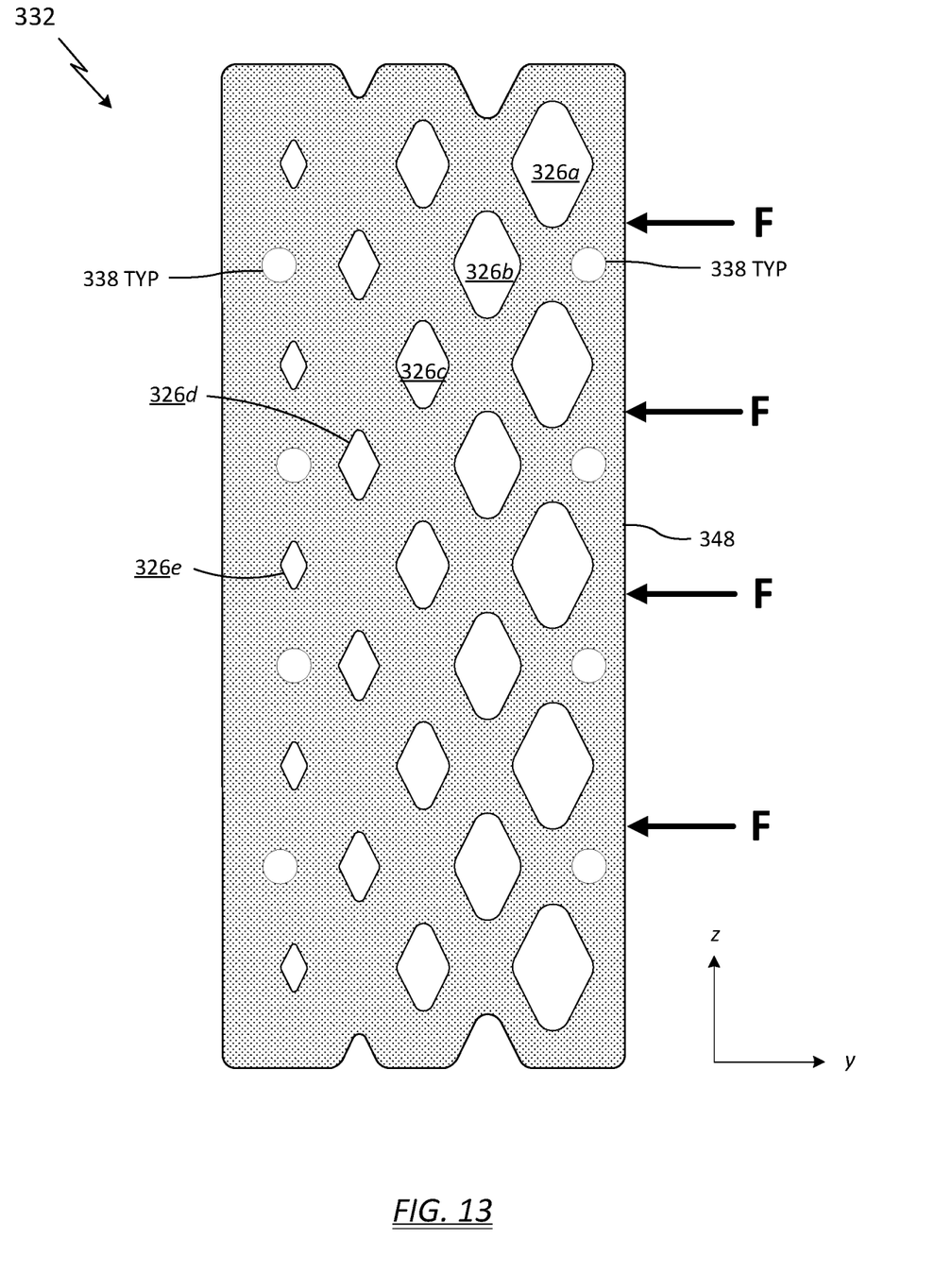
FIG. 13 depicts a side plan view of the elastomer spring block shown in FIG. 12.

FIGS. 12 and 13 depict the elastomer spring block 332 in greater detail. The primary difference in this embodiment is the manner in which the elastomeric material 348 is segmented. Here, the material extends the full height and depth of the bumper 324 (e.g., 18 inches in the z-direction and 6 inches in the y-direction), but is only about 2 inches wide in the x-direction. This configuration allows the overall width of the dock bumper 324 to be tailored for a specific application. The elastomer spring block 332 includes a pattern of geometric cavities 326a-326e configured to provide a progressive spring rate in the longitudinal direction (e.g., the y-direction) relative to the loading dock.

As can be seen by the force arrows (F) representing the shock load from a tractor trailer, the elastomeric material 348 will initially deform greatest at the largest geometric cavities 326a, which represents the smallest spring rate. Eventually the large cavities 326a will collapse, and the next-largest cavities 326b will deform until they collapse. However, because the cavities have a smaller cross-sectional area, there is more elastomeric material 348 present and thus the spring rate will be higher, providing more resistance. As the trailer continues its backward motion, eventually the geometric cavities 326a-326e will collapse and the elastomeric material will not be able to compress further. At this point, the effective spring rate of the dock bumper 324 becomes greater than the force of the truck trailer, and its motion is stopped.

The dock bumper 324 absorbs the shock load from the trailer and prevents transference of the shock load to the loading dock wall 14. The geometric cavities 326 provide a progressively increasing spring rate as the elastomeric material 348 is compressed. Furthermore, the dock bumper provides a "hard stop" to accurately position the trailer the proper distance from the loading dock.

The elastomer spring block 332 may further define a plurality of thru holes 338 (e.g., in the x-direction). Bolt holes can be drilled into the rear mounting plates 330 to align with the thru holes 338, and a fastener 340 can be passed through the holes and secured on each end, thereby securing the elastomeric material 348 in place. The rear mounting plates 330 can be bolted directly to the loading dock wall 14. Similarly, bolt holes can be drilled into the side extensions 336 to align with the thru holes 338, and a fastener 340 can be passed through the holes and secured on each end, thereby securing the elastomeric material 348 in place.

Embodiments of the disclosed elastomer spring block may be useful in other applications besides a loading dock bumper. For example, the elastomeric material with a pattern of geometric cavities provides excellent acoustic dampening. The elastomer spring block can thus be utilized as a sound-absorbing cushion in those applications where metal-to-metal contact of mechanical arms and linkages creates a high-decibel disturbance. The geometric cavities could be the same size throughout, similar to the pattern shown in FIG. 9, or could progressively increase or decrease in the longitudinal direction to provide a more pronounced spring rate. Furthermore, the front contact surface may not include a hardened plate or side extensions. The front contact surface may simply comprise the surface of the elastomeric material.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A loading dock structure, comprising:
    a dock seal structure surrounding a door opening, adapted to provide an environmental seal between the interior of a trailer and the loading dock, the dock seal structure comprising vertical side members along either side of the door opening, and a horizontal header extending across the top of the door; and
    a dock bumper, comprising:
        a rear mounting plate for use in securing the dock bumper to a loading dock wall;
        a front contact surface configured to engage a vehicle rear frame while backing into the loading dock; and
        an elastomer spring block positioned between the rear mounting plate and the front contact surface, the elastomer spring block comprising an elastomeric material defining a pattern of geometric cavities configured to provide a progressive spring rate in a longitudinal direction relative to the loading dock.

2. The loading dock structure of claim 1, wherein the pattern of geometric cavities extend in a lateral direction relative to the loading dock.

3. The loading dock structure of claim 2, wherein geometric cavities extend through the entire lateral dimension of the elastomeric material.

4. The dock bumper loading dock structure of claim 1, wherein the spring rate progressively increases as the elastomer spring block compresses.

5. The loading dock structure of claim 4, wherein the pattern of geometric cavities comprise a successively decreasing cross-sectional area in the longitudinal direction of the progressively increasing spring rate.

6. The loading dock structure of claim 4, wherein the pattern of geometric cavities are equal in cross-sectional area.

7. The loading dock structure of claim 1, wherein the front contact surface comprises a hardened plate to protect the elastomer spring block from damage.

8. The loading dock structure of claim 7, wherein the front contact surface further comprises side extensions.

9. The loading dock structure of claim 8, wherein the side extensions and the elastomeric material define a plurality of thru holes in alignment, and the dock bumper further includes a fastener passing through the holes to secure the front contact surface and spring block together.

10. The loading dock structure of claim 1, wherein the rear mounting plate and the elastomeric material define a plurality of thru holes in alignment, and the dock bumper further includes a fastener passing through the holes to secure the rear mounting plate and spring block together.

11. The loading dock structure of claim 1, wherein the rear mounting plate is a double angle arrangement comprising opposing right-angle brackets configured to mount directly to a concrete wall.

12. The loading dock structure of claim 1, wherein the rear mounting plate is a single-angle arrangement comprising one right-angle bracket and one opposing flat plate, the right-angle bracket for use in mounting the dock bumper directly to a concrete wall, the flat plate for use in welding the dock bumper to a metal surface on the loading dock wall.

13. The loading dock structure of claim 1, wherein the rear mounting plate is a flat mount arrangement comprising two opposing flat plates configured to be welded to a metal surface on the loading dock wall.

14. The loading dock structure of claim 1, wherein the elastomer spring block comprises a singular piece of elastomeric material.

15. The loading dock structure of claim 1, wherein the elastomer spring block comprises a plurality of segments stacked in the vertical z-direction.

16. The loading dock structure of claim 1, wherein the elastomer spring block comprises a plurality of segments stacked in the lateral x-direction.

17. The loading dock structure of claim 1, wherein the elastomeric material is formed of ethylene propylene diene monomer rubber.

* * * * *